(12) United States Patent
Ben-Amram et al.

(10) Patent No.: US 11,960,436 B2
(45) Date of Patent: Apr. 16, 2024

(54) MULTI-PROCESSOR SYNCHRONIZATION

(71) Applicant: Microsoft Technology Licensing, LLC, Redmond, WA (US)

(72) Inventors: Nadav Shlomo Ben-Amram, Herzliya (IL); Netanel Hadad, Petah Tikva (IL); Liran Biber, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 17/732,766

(22) Filed: Apr. 29, 2022

(65) Prior Publication Data
US 2023/0350842 A1 Nov. 2, 2023

(51) Int. Cl.
*G06F 9/02* (2006.01)
*G06F 15/173* (2006.01)

(52) U.S. Cl.
CPC .. *G06F 15/17325* (2013.01); *G06F 15/17337* (2013.01)

(58) Field of Classification Search
CPC ................ G06F 15/17325; G06F 15/17337
See application file for complete search history.

(56) References Cited

U.S. PATENT DOCUMENTS

| | | | | |
|---|---|---|---|---|
| 5,958,019 A * | 9/1999 | Hagersten | ................ | G06F 9/52 711/144 |
| 5,961,639 A * | 10/1999 | Mallick | ................ | G06F 9/4881 712/E9.05 |
| 6,629,212 B1 * | 9/2003 | Arimilli | ............... | G06F 12/0815 711/144 |
| 6,918,009 B1 * | 7/2005 | Sato | .................... | G06F 12/0815 711/213 |
| 7,836,280 B1 * | 11/2010 | Tene | ...................... | G06F 9/355 712/216 |
| 9,043,770 B2 | 5/2015 | Aliseychik et al. | | |
| 9,081,688 B2 * | 7/2015 | Hinton | ................ | G06F 12/0817 |
| 9,274,960 B2 * | 3/2016 | Kaxiras | ............... | G06F 12/0815 |

(Continued)

FOREIGN PATENT DOCUMENTS

| | | |
|---|---|---|
| CN | 1863062 A | 11/2006 |
| EP | 1912119 B1 | 5/2010 |

OTHER PUBLICATIONS

Stuijk, et al., "Multiprocessor Resource Allocation for Throughput-Constrained Synchronous Dataflow Graphs", In Proceedings of the 44th Annual Design Automation Conference, Jun. 4, 2007, pp. 777-782.

*Primary Examiner* — Cheng Yuan Tseng
(74) *Attorney, Agent, or Firm* — Holzer Patel Drennan

(57) ABSTRACT

A method of synchronizing system state data is provided. The method includes executing a first processor based on initial state data during an update cycle, wherein the initial state data represents a state of the system prior to initiation of the update cycle, detecting changes in state of the system by the first processor using sensors, the changes in state being added to a record of modified state data until a predefined progress position within the update cycle, designating the modified state data as next state data, based on reaching the predefined progress position within the update cycle, and transitioning from execution of the first processor based on the initial state data to execution of the first processor based on the next state data, based on completion of the update cycle.

21 Claims, 7 Drawing Sheets

(56) References Cited

U.S. PATENT DOCUMENTS

| | | | |
|---|---|---|---|
| 9,529,882 B2* | 12/2016 | Vermeulen | G06F 16/27 |
| 10,114,880 B2* | 10/2018 | Vasantham | G06F 16/27 |
| 10,176,020 B2 | 1/2019 | Challa et al. | |
| 2014/0068625 A1 | 3/2014 | Winser | |
| 2020/0334072 A1 | 10/2020 | Kato | |

* cited by examiner

MULTI-PROCESSOR SYNCHRONIZATION

BACKGROUND

Systems that include multiple processors execute based at least in part on state data. State data includes data representing physical states of the system. For example, physical states can include posture of the device (e.g., a relative orientation of elements in the system), position, physical engagement (e.g., user and/or external hardware engagement with the system), operation modes (e.g., an active or idle state). Execution based at least in part on this state data can be coordinated between multiple processors within the system.

SUMMARY

The described technology provides synchronizing of system state data by executing a first processor based on initial state data during an update cycle, wherein the initial state data represents a state of the system prior to initiation of the update cycle, detecting changes in state of the system by the first processor using sensors, the changes in state being added to a record of modified state data until a predefined progress position within the update cycle, designating the modified state data as next state data, based on reaching the predefined progress position within the update cycle, and transitioning from execution of the first processor based on the initial state data to execution of the first processor based on the next state data, based on completion of the update cycle.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
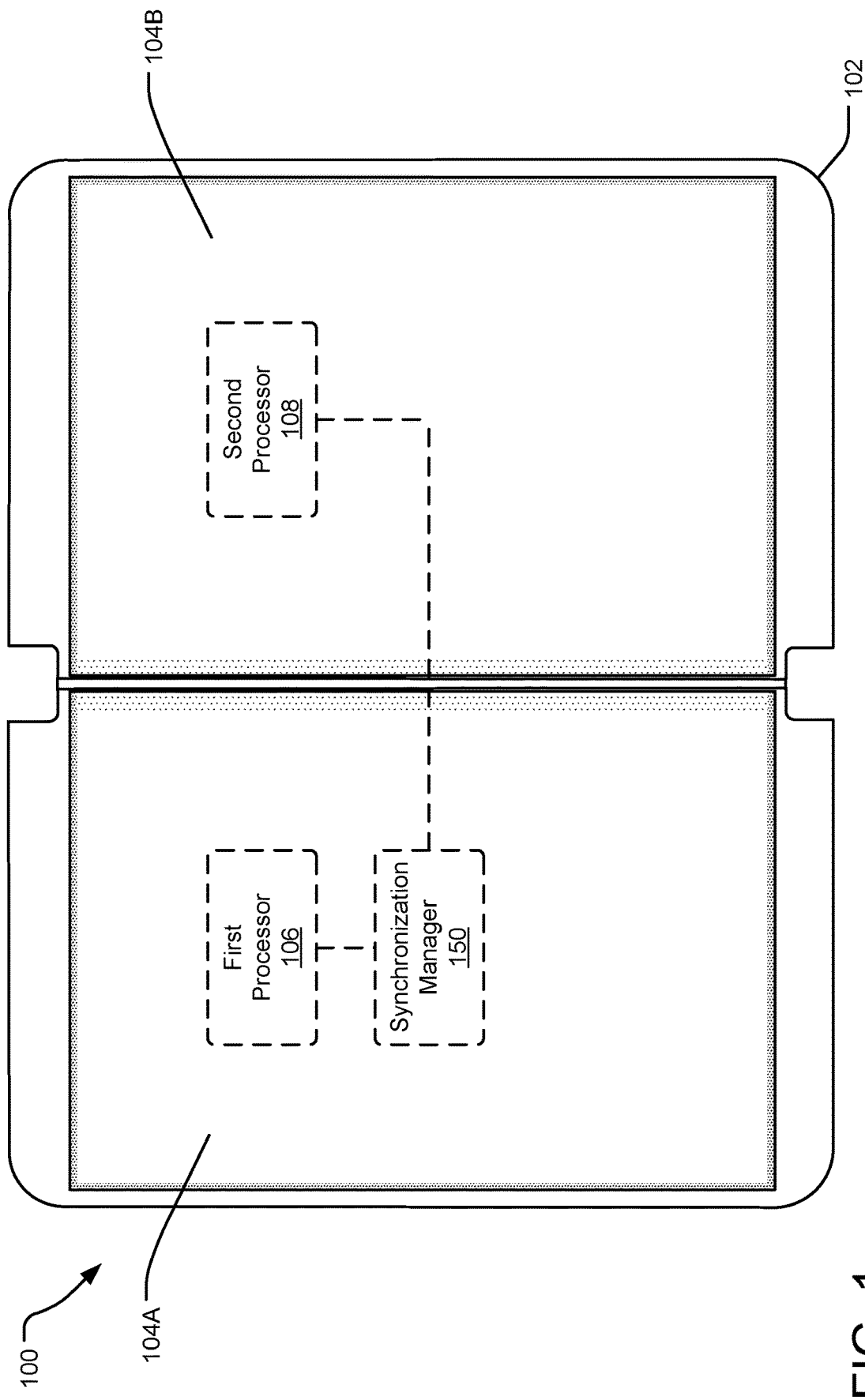
FIG. 1 illustrates an example system with multi-processor state synchronization.

Systems with multiple processors executable to perform the same or different tasks benefit from coordination and scheduling. Such multi-processor coordination and scheduling can ensure that operations are not dropped, that operations from different processors are conducted in sequence, and that redundant operations are not executed. In systems with multiple processors and/or with processors dedicated to specific applications in hardware, the activities of the processors can occupy more processing resources to synchronize. Adding to or removing processors from the system (e.g., by adding or removing hardware elements with dedicated processors) can further complicate the coordination.

Multi-processor systems may benefit from coordination between the multiple processors to effectively execute tasks. For example, in a system that includes an electronic writing implement (e.g., a stylus), the electronic writing implement may include an internal processor that is expected to coordinate with a processor of a display to write to the display. The system may coordinate with both of the processors to indicate changes of state. The display may initially be in an idle state in which the display is dark or plays a screen saver. A central processing unit (CPU) of the system may receive sensor data from the electronic writing implement that motion of the electronic writing implement indicates the display is in a state of use.

Accordingly, the central processing unit may be tasked with synchronizing the states of processors of the electronic writing implement and the display to ensure that the display is in a state adapted to receive writing data from the electronic writing implement. This level of coordination can be complicated by the relative timing of communications between the CPU and the processors of the electronic writing implement and the display. Inappropriate coordination can result in lost data and customer dissatisfaction.

The presently disclosed technology provides a system for readily updating state data based at least in part on information provided by multiple processors. For example, a processor of a multi-processor system may detect a change in state in response to data received from sensors (e.g., a motion sensor indicating physical engagement with the system). The system may work on a predefined update cycle schedule managed by an update cycle manager, and the system may rely on the timing of the update cycles to determine how state data is updated and provided to the multiple processors. During a write portion of the update cycle, the system may collect data used to generate modified state data to modify or replace data representing an initial state (hereinafter, "initial state data") established prior to initiation of an update cycle to render data representing a next state (hereinafter, "next state data").

At a predefined progress position in the update cycle, the system may lock the modifications to the modified state data (e.g., by a mutual exclusion or lock function), may designate the modified state data as next state data, and may modify data stored in a state buffer space associated with each processor of the multiple processors to include the next state data.

The system may wait to receive an acknowledgment from each of the processors expected to receive the modified state data that the modified state data has been received and/or been written into each associated state buffer. At the completion of the update cycle, if sufficient processors have acknowledged receipt of the modified state data (e.g., in implementations, all of the processors), each processor may, in a state data execution transition, transition from execution based at least in part on a portion of the state buffer with what was initial state data to execution based at least in part on a portion of the state buffer with next state data that has been modified based at least in part on (e.g., based at least in part on a designation that the modified state data has become next state data) or replaced with the modified state data. If the system does not receive an acknowledgment from all of the processors from which the system is configured to receive the acknowledgment, the system may retransmit the data to the processors and again wait for an acknowledgment. If the acknowledgment is received, each processor may transition execution from a portion of the state buffer with what was initial state data to a portion of the state buffer with next state data that has been modified based at least in part on or has been designated as the modified state data transmitted. At the completion of the update cycle, the system may allow further writes to the modified state data to generate modified state data to be designated as next state data for use in a subsequent update cycle. Implementations are contemplated in which the slave processors automatically execute from the next state data in the state data buffer even without receiving an acknowledgment from the synchronization manager at the completion of an update cycle.

In an implementation, a state buffer associated with a processor may include a first state data portion and a second state data portion. Either of the first state data portion and the second state data portion may be adapted to store initial state data based that represents state data based at least in part on which the processor executes at an initiation of an update cycle. When the system transmits modified state data to the processor, the modified state data may be designated as next state data and modify or replace data already stored in the other of the first state data portion and the second state data portion. At the completion of the update cycle, the processor may, in a state data execution transition, transition from execution based at least in part on the state data portion storing the initial state data to execution based at least in part on the state data portion storing the next state data.

In implementations, the multiple processors include a processor designated as a synchronization master processor with the remaining processors being designated synchronization slave processors. In these implementations, the state data buffers of one or more of the synchronization master processor and the synchronization slave processors may further include a modified data portion. Modifications to the state data that are recorded within the update cycle (e.g., before the predefined progress position within the update cycle) may be written to the modified data portion of the synchronization master processor (e.g., to the exclusion of the synchronization slave processors). At a point in an update cycle (e.g., at the predefined progress position within the update cycle), the master processor may transmit the modified state data to the other (slave) processors to be written to either of the first state data portion and the second data portion of the state data buffers associated with the other (slave) processors. In a variation of these implementations, the state buffers may all include a portion of a state buffer to store the modified state data. In this variation, the modified state data may only be written to the state buffer associated with the master processor. The other (slave) processors may include this buffer to account for a situation where the master processor role changes between processors such that the modified state data portion of the state buffer is inactive in a slave processor until the slave processor becomes a master. In a different variation, the state buffers of the slave processors do not include a portion for storing modified state data.

In implementations, the processors may wait to change, in a state data execution transition, from execution based at least in part on one of the first state data portion and the second data portion of the state data buffer containing the initial state data to the other of the first state data portion and the second data portion containing next state date (e.g., next state data modified or replaced by the transmitted modified state data) until receiving a further acknowledgment from the system (e.g., from one or more of a first master processor and a synchronization manager of the system) that all processors operable to respond to such changes in state data have received the modified state data.

By waiting until the completion of an update cycle to synchronize execution based at least in part on state data between processors, the instructions between the processors could be sufficiently coordinated to ensure that all processors configured to respond to the change of state execute the same state data at any given time.

FIG. 1 illustrates an example system 100 with multi-processor state synchronization. The system 100 includes a multi-display device 102 with a first display 104a that executes operations from a first processor 106 and a second display 104b that executes operations from a second processor 108. In a multi-display device 102, the displays 104a and 104b are expected to coordinate operations. For example, if both displays are in an inactive or idle state, engagement with (e.g., a user touch or manipulation of) the first display 104a may be expected to activate both the engaged first display 104a and the second display 104b that was not directly engaged. Without communication between the first processor 106 and the second processor 108, the engagement with the first display 104a may be ignored by the second processor 108, preventing the second processor 108 from activating the second display 104b.

In implementations, the multi-display device 102 includes a synchronization manager 150. The synchronization manager 150 records updates to state data and generates modified state data based at least in part on the updates. The synchronization manager 150 may communicate the modified state data to processor-specific state data buffers to provide next state data on which each of the processors executes depending on progress within a processing update cycle (hereinafter, an "update cycle") managed by an update cycle manager. As used herein, an update cycle represents a predefined period of time or a predefined number of processor operations. The update cycle may be a static quantity or may be dynamic based at least in part on data states (e.g., states represented in the state data or states represented in other data). For example, an update cycle in an idle state of the multi-display device 102 may be different from an update cycle in an active state of the multi-display device 102.

The synchronization manager 150 may be configured to secure and transmit modified state data at a predefined progress position within an update cycle (e.g., a predefined percentage of the update cycle, at a predefined time within an update cycle, or at a predefined number of processor operations within an update cycle). The synchronization manager 150 may lock the recording of any more updates to the modified state data (e.g., using a mutual exclusion or lock function) and designate the modified state data as next state data. The synchronization manager 150 may then communicate the modified state data to processor-specific state data buffers. In implementations, the synchronization manager 150 then receives acknowledgments that the modified state data was received. In implementations, if the synchronization manager 150 does not receive an acknowledgment from all processors 106 and 108 configured to receive the state data (e.g., all processors 106 and 108 that are affected by the state data), the synchronization manager 150 will continue to transmit the same modified state data until acknowledgments are received from all of the processors 106 and 108. Implementations are also contemplated in which all processors 106 and 108 with which the synchronization manager 150 communicates state data receive the same state data (e.g., a single struct or object with parameter values for the state data provided to all of the processors 106 and 108).

The state data buffer is a construct that includes portions dedicated to storing different state data. In an implementation, a state data buffer associated with a processor 106 or 108 includes a first state data portion and a second state data portion. Either of the first state data portion and the second state data portion may be adapted to store initial state data based at least in part on which the processor 106 or 108 associated with the state buffer operates at the initiation of an update cycle. When the system transmits next state data to the processor 106 or 108, the next state data may modify or replace data already stored in the other of the first state data portion and the second state data portion with the modified or replaced data representing next state data. At the completion of the update cycle, the processor 106 or 108 may transition, in a state data execution transition, from executing based at least in part on the state data portion storing the initial state data to executing based at least in part on the state data portion storing the next state data. In implementations, the processor 106 or 108 may further wait for an acknowledgment from the synchronization manager 150 that all other processors 106 and 108 have received the modified state data before conducting the state data execution transition at the completion of an update cycle.

In implementations in which a processor serves as a synchronization master processor, the synchronization manager 150 is integral to or directly communicatively coupled within the same hardware with the first processor 106. In a variation of this implementation, more than one of the multiple processors 106 and 108 are integral to or directly communicatively coupled within the same hardware with instances of the software and/or hardware of the synchronization manager 150 but only activate the local synchronization manager 150 when designated a master (e.g., to appoint a different master if an existing master is removed or fails). Implementations are also contemplated in which the state data buffers and synchronization manager 150 are common elements of a single synchronization hardware and/or software set that is common to all processors 106 and 108, such that any of the processors 106 or 108 could assume the role of a master. Alternatively or additionally, the same single synchronization hardware and/or software set can be used for multiple processor systems and single processor systems alike, providing better manufacturing efficiency by standardizing the state data instruction set. In an implementation, the state data buffers are elements of a state data manager of the synchronization manager 150.

In implementations, the synchronization manager 150 may toggle between active and inactive states. For example, the system 100 may deactivate the synchronization manager at the completion of an update cycle or at a different predetermined time. The system 100 may reactivate the synchronization manager 150 upon receipt of an update to the state data of the system 100. This may conserve both energy and computing resources in update cycles in which no state has changed (e.g., no updates to state data are received).

While the illustrated example has been described in terms of a state change representing engagement with a display 104a and 104b, the synchronization manager 150 may handle any number of state data types. For example, the state data can include, without limitation, data representing one or more of a hinge angle (e.g., of a hinge between the displays 104a and 104b), stylus data (e.g., position, orientation, distance from the displays 104a and/or 104b, and other sensor data derived from a digital writer), idle states, active states, logging severity level, display status (e.g., on or off), and secure status (e.g., locked or unlocked).

Figure 2:
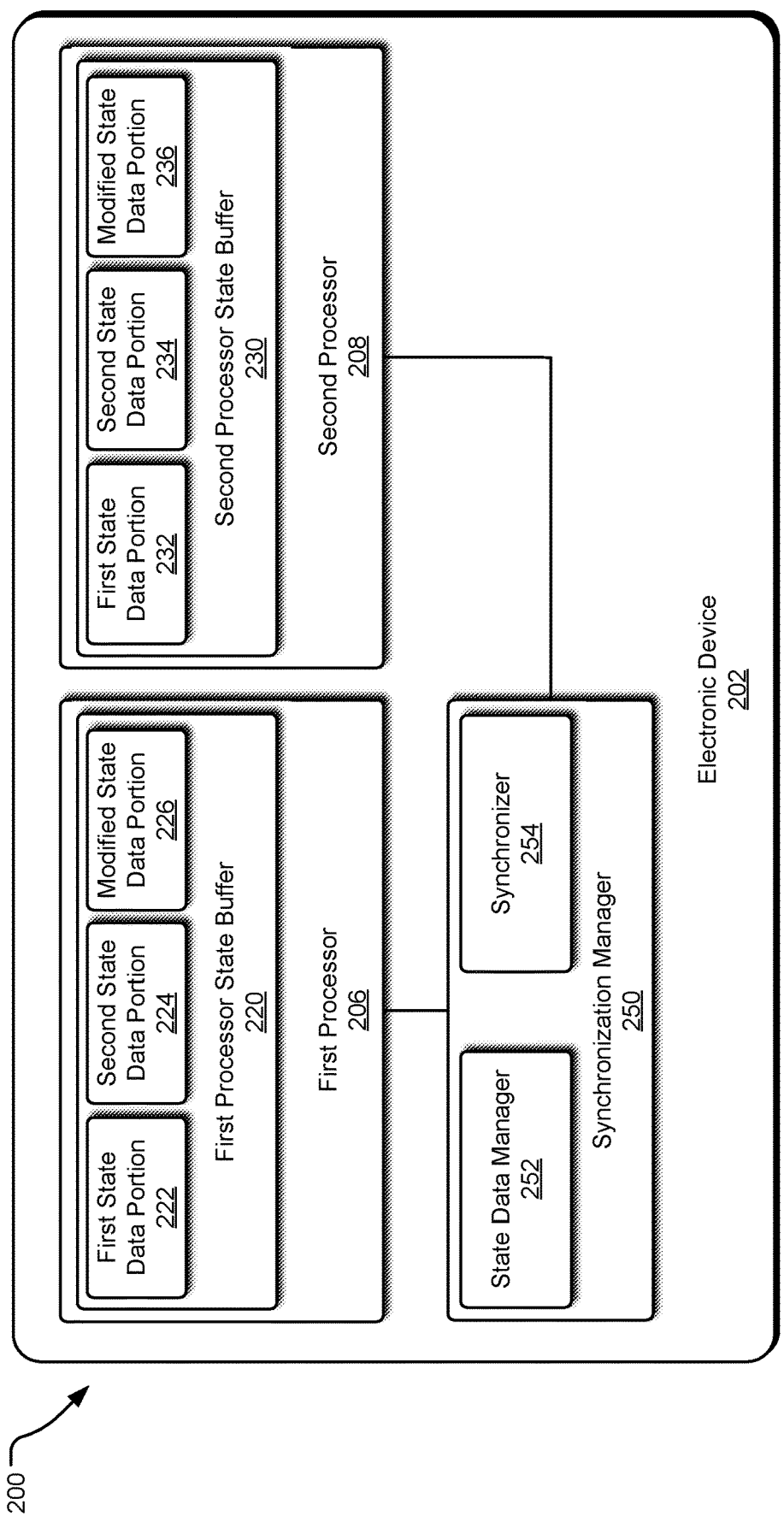
FIG. 2 illustrates another example system with multi-processor state synchronization.

FIG. 2 illustrates another example system 200 with multiprocessor state synchronization. System 200 may be an implementation of system 100. The system 200 includes a first processor 206 with a first processor state buffer 220 and a second processor 208 with a second processor state buffer 230. The first processor state buffer 220 includes separate first and second state data portions 222 and 224 operable to store initial state data and next state data and also includes a modified state data portion 226, and the second processor state buffer includes separate first and second data portions 232 and 234 operable to store its own instance of the initial state data and the next state data and also a modified state data portion 236. While illustrated as integral to the processors 206 and 208, the respective state buffers 220 and 230 may be otherwise communicably coupled to the respective state buffers 220 and 230 (e.g., within the same hardware element or within the same device) or may be elements of a synchronization manager 250.

The system also includes a synchronization manager 250 that synchronizes state data between the first processor 206 and the second processor 208. In the illustrated implementation, the synchronization manager 250 includes a state data manager 252 and a synchronizer 254. The state data manager 252 manages state data to be stored or transmitted. For example, state data updates to be included in modified state data portions 226 or 236 may be received, formatted, compiled, and otherwise processed by the state data manager 252. In implementations, although illustrated otherwise here, the state data manager 252 may include one or more of the state data buffers 220 and/or 230. For example, in an implementation, the state data manager 252 may store state buffers 220 and/or 230 for one (e.g., a synchronization master processor) or more of the processors 206 and/or 208.

The synchronizer 254 transmits modified state data to be used in the state buffers 220 and 230 as next state data in one or more of the state data portions 222, 224, 232, and 234. The synchronizer 254 may also be operable to communicate acknowledgments between the processors 206 and 208 and the synchronization manager 250. For example, the synchronizer 254 may transmit next state data to the processors 206 and 208. Based at least in part on the transmitted next state data, the processors 204 and 206 may transmit an acknowledgment that the modified state data was received that is received by the synchronizer 254. In implementations, the synchronizer 254 further transmits an acknowledgment to the processors 206 and 208 that all of the processors 206 and 208 may change execution from initial state data to next state data based at least in part on receiving acknowledgments that all processors 206 and 208 have received the modified state data.

The state data manager 252 may accumulate state updates from any of the processors 206 and 208 or other elements of the system 200 (e.g., other computing device hardware) to generate modified state data. The modified state data may be stored locally in the state data manager 252 or may be stored in a modified state data portion 226 or 236 of a synchronization master processor, which may be either of the processors 206 or 208. At a predefined progress position within an update cycle, the synchronizer 254 may instruct the state data manager 252 to lock edits to the modified state data, may designate the modified state data as next state data, and may transmit the next state data to the state data portion 222 or 224 and 232 or 234 that does not store the initial state data of the first processor state buffer 220 and the second processor state buffer 230, respectively. At the time that the predefined progress position is reached, the first processor 206 and the second processor 208 may be executing from state data portions 222 or 224 and 232 or 234 that store initial state data, respectively. When the second processor state buffer 230 receives the next state data, the second processor 208 transmits an acknowledgment to the synchronizer 254. The second processor stores the next data to one of the state data portions 232 or 234 that does not store initial state data.

The state data portion 232 or 234 that does not store initial state data may store state data from a previous state before processor execution from the initial state data began and that is no longer relevant or may have already been cleared of that prior state data, and the modified state data designated the next state data during the update cycle is written to the one of the first state data portion 232 and the second data portion 234 that does not store initial state data. At the completion of the update cycle, in a state data execution transition, the second processor transitions execution from a state data portion 232 or 234 storing the initial state data to the other state data portions 232 or 234 storing the next state data that is based at least in part on the modified state data. At this point, the next state data becomes the initial state data, and the initial state data from before becomes prior state data to be updated with modified state data from the next update cycle and/or deleted. In this way, the first state data portion 232 and the second data portion 234 may alternate between storing initial state data and next state data.

The same operating principle may apply to any other processor's state buffer, including the first processor state buffer 220. In an implementation, the state data manager 252 conducts the state data execution transition at the completion of the update cycle, regardless of whether the synchronizer 254 transmits an instruction to transition execution and/or acknowledges that acknowledgments were received from all of the other processors. In other implementations, the state data manager 252 conducts the state data execution transition only after both the completion of the update cycle is reached and an acknowledgment (or other instruction) indicating that the synchronizer 254 has received an acknowledgment from all of the processors that the modified state data was received is transmitted to the processors 206 and 208.

The state data execution transition may be conducted by the synchronizer 254 transmitting data representing a value of a state data counter that iterates at each state data execution transition. The state data counter may reflect a version of one or more of the initial state data and the next state data. After the iteration, the counter value that represents the next state data is established as the state data counter value and transmitted to the processors 206 and 208 to indicate that the processors 206 and 208 are to execute from the next state data (which then becomes the initial state data).

In implementations, the system 200 designates or is otherwise preconfigured to establish the first processor 206 as a synchronization master processor. In this implementation, the state data manager 252 may modify data in the modified state data portion 226 of the first processor state buffer 220 as updates are received during a write portion of an update cycle prior to reaching a predefined progress position in the update cycle. Also, implementations are contemplated in which the synchronization master processor is responsible for transmitting all state data updates to the synchronization manager 250. In those implementations, the first processor 206 may receive state data updates from other synchronization slave processors 208 and/or from other hardware of the system 200 via an operating system of the system 200 or directly (e.g., using system interrupts to introduce the state data updates). In implementations in which the synchronization manager 250 is integral with or otherwise coupled by a hardware element with the first processor 206, which is a synchronization master processor, the state data manager 252 may write state data updates to the modified state data portion 226 to collect the state data updates to form next state data to be stored in one of the state data portions 222 or 224 after the system 200 reaches the predefined progress position in the update cycle that signals the completion of the write portion of the update cycle and the beginning of a transmission and acknowledgment portion of the update cycle. In implementations, the modified state data portion 226 or 236 is only edited in the processor 206 or 208 designated as the synchronization master processor. Synchronization slave processors may also include modified state data portions because the modified state data portions are standard elements supplied to processors and/or because the modified state data portions can be utilized if a synchronization slave processor is transitioned to a synchronization master processor.

As indicated, the first processor 206 may be designated or is otherwise established as the synchronization master processor such that it solely includes the synchronization manager 250, or separate instances of the synchronization manager 250 may be associated with each of the processors 206 and 208 with the function to activate the synchronization manager 250 associated with a processor 206 or 208 when the processor 206 or 208 is established as a synchronization master processor. In implementations, one or more of the first processor 206 and the second processor 208 may include an instance of the synchronization manager 250. For example, the synchronization manager 250 may be a hardware and/or software element of the processors 206 and/or 208 or may be integral to or otherwise installed in the hardware to which the processors 206 and/or 208 are communicably coupled. The synchronization manager 250 may be installed uniformly in a number of processors 206 and/or 208 or their respective connective hardware to allow for a synchronization manager that functions in both single-processor systems and multi-processor systems 200.

Figure 3:
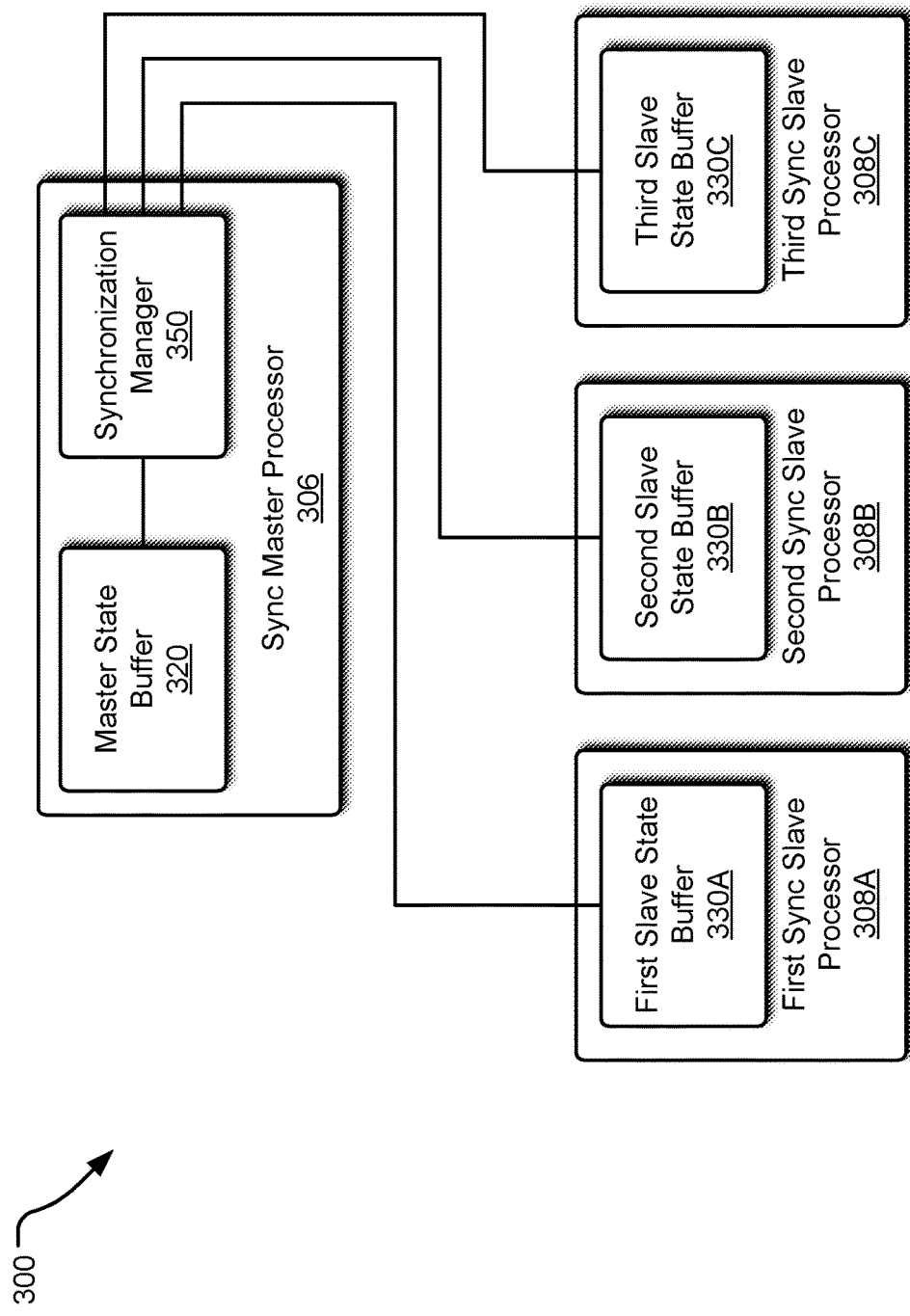
FIG. 3 illustrates an example master-slave relationship in a system with multi-processor state synchronization.

FIG. 3 illustrates an example master-slave relationship in a system 300 with multi-processor state synchronization. The system 300 includes a synchronization master processor 306 and synchronization slave processors 308A-C. The synchronization master processor 306 includes a master state buffer 320 and a synchronization manager 350. The synchronization manager 350 updates state data and synchronizes the state data updates between the synchronization master processor 306 and the synchronization slave processors 308A-C. For example, the synchronization manager may receive state data updates from the synchronization master processor 306. These updates may originate from the synchronization master processor 306 and/or may be received by the synchronization master processor 306 from an operating system of a device and/or from synchronization slave processors 308A-C. The synchronization manager 350 may write these updates to a modified state data portion of the master state buffer 320.

At the initiation of an update cycle, the processors 306 and 308A-C may be executing from initial state data from a previous update cycle. When a predefined progress position in an update cycle is reached, signaling the completion of a write portion of the update cycle, the synchronization manager 350 locks writes to the modified state data portion of the master state buffer 320 (e.g., by a mutual exclusion or lock function). The remainder of the update cycle before the completion of the update cycle can be characterized as a transmission and acknowledgment portion of the update cycle. During the transmission and acknowledgment portion of the update cycle, the synchronization manager 350 transmits the modified state data stored in the master state buffer 320 as next state data to a first or second portion of each of the master state buffer 320 and the slave state buffers 330A-C that does not include initial state data (e.g., a portion that includes prior state data that was initial state data prior to a state data execution transition to execute the initial state data or from which the said prior state data is deleted). It should be appreciated that the first and second portions of the master state buffer 320 and the slave state buffers 330A-C for storing initial state data and next state data may be substantially the same. In implementations, the master state buffer 320 may differ from the slave state buffers 330A-C in that the slave state buffers 330A-C may not include a modified state data buffer or may not actively use the modified state buffer unless their associated processors are designated as the synchronization master processor 306 (e.g., when the synchronization master processor 306 is removed or inactive). The synchronization manager 350 may receive acknowledgments from the synchronization master processor 306 and or the synchronization slave processors 308A-C, indicating that the modified state data was received by the acknowledging processors 306 and/or 308A-C. Implementations are contemplated in which the master state buffer 320 is or is not integral with the synchronization manager 350 such that the synchronization manager is operable to or operable to not receive acknowledgments from and/or transmit acknowledgments to the synchronization master processor 306.

In implementations, each of the synchronization master processor 306 and the synchronization slave processors 308A-C conduct a state data execution transition that transitions data execution from the initial state data to the next state data (e.g, the next state data based at least in part on the modified state data received) in the master state buffer 320 and/or slave state buffers 330A-C. In another implementation, the state data execution transition is triggered solely upon the completion of the update cycle. In another implementation, the synchronization manager transmits to one or more of the processors 306 and 308A-C an indication that the acknowledgments have been received from one or more of the processors 306 and 308A-C operable to transmit the acknowledgments. For example, in response to receiving acknowledgments from the one or more processors 306 and 308A-C operable to transmit state data acknowledgments, the synchronization manager 350 may iterate a state data counter to a value that represents a version of the next state data or the initial state data, and transmits the state data counter value to the one or more processors 306 and 308A-C. In so doing, the one or more processors 306 and 308A-C transition execution to the next state data stored in the one or more associated master state data buffer 320 and/or slave state buffers 330A-C, making the next state data initial state data for the following update cycle.

Figure 4:
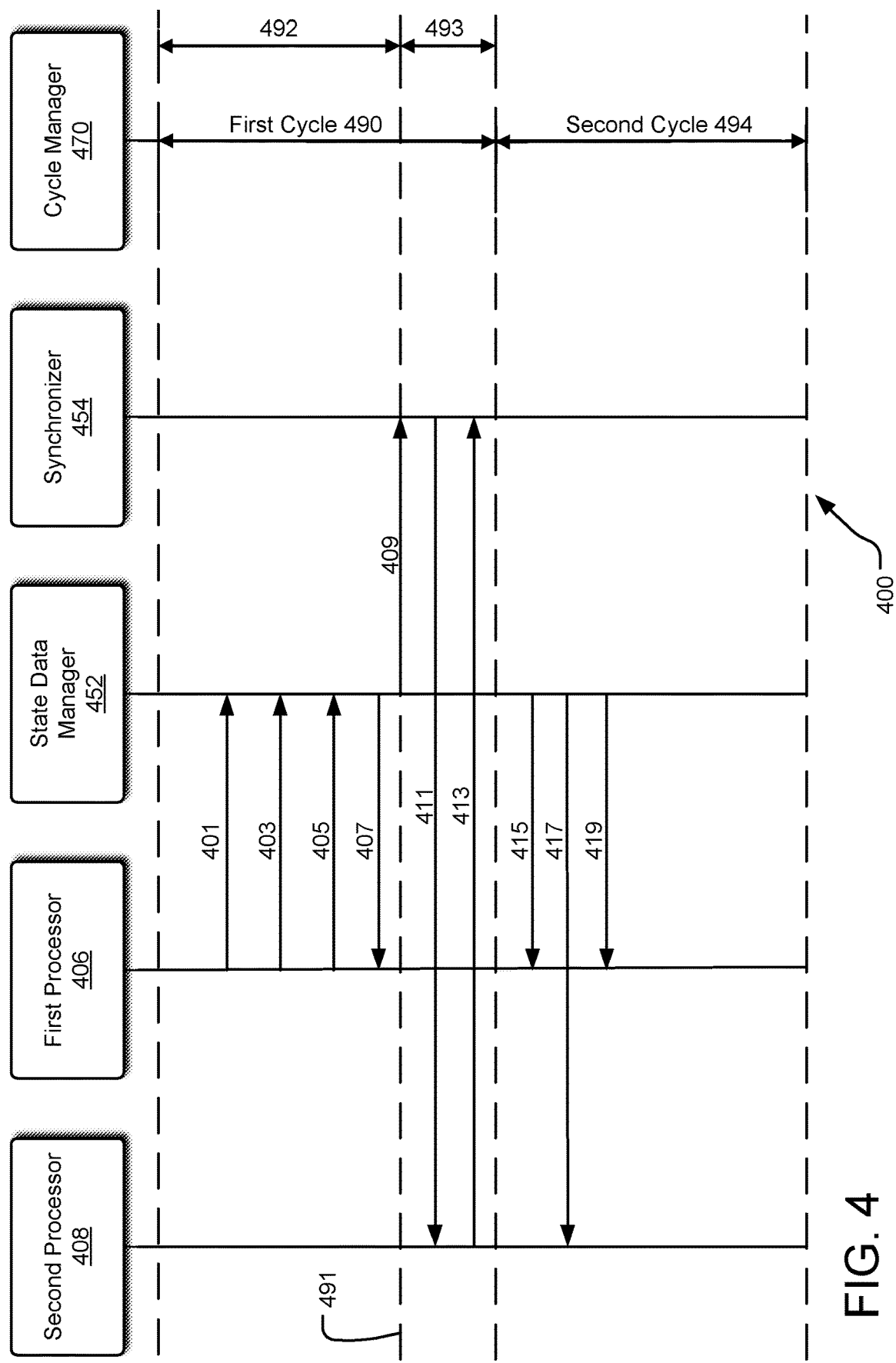
FIG. 4 illustrates an example data flow within an example system with multi-processor state synchronization.

FIG. 4 illustrates an example data flow 400 within an example system with multi-processor state synchronization. When a first update cycle 490 is initiated, the processors 406 and 408 execute on initial state data representing a state of the system from a previous update cycle. State data updates representing changes in the state of the system are transmitted by a first processor 406 to a state data manager 452 in communications 401-403. In the illustrated implementation, the first processor 406 is a synchronization master processor. A modified state data update based at least in part on the state data updates transmitted in communications 401-403 is transmitted and/or written from the state data manager 452 to a portion of the state data buffer of the first processor 406 (e.g., in a portion of the master state buffer operable to store modified state data) in communication 407. Although the modified state data update communicated in communication 407 is illustrated as including all of the state data updates from communications 401-403, implementations are contemplated in which separate modified state data updates are made based at least in part on each of the state data updates in communications 401-403 in separate communications 407.

When a predefined progress position 491 of a first update cycle 490 is reached, it may signal the completion of the write portion 492 of the first update cycle 490 and the beginning of a transmission and acknowledgment portion 493 of the first update cycle 490. The update cycles may be managed by an update cycle manager 470 that is in communication with one or more of the first processor 406, the second processor 408, the state data manager 452, and the synchronizer 454. Upon reaching the predefined progress position 491 of the first update cycle 490, the state data manager 412 may lock edits to the modified state data in the state data buffer of the first processor 406. The state data manager 412 may then designate the modified state data stored in the buffer as next state data and communicate the new next state data to the synchronizer 454 in a communication 409.

During the transmission and acknowledgment portion 493 of the first update cycle 490, the synchronizer 454 communicates the next state data to the second processor 408 (e.g., to a slave buffer portion operable to store next state data) in communication 411. Upon receiving the modified state data from communication 411, the second processor 408 transmits an acknowledgment to the synchronizer 454 in communication 413. Although the illustrated implementation does not illustrate that the first processor 406 receives the modified state data (e.g., based at least in part on the first processor 406 including the modified state data in its own associated master state data buffer), implementations are contemplated in which the first processor 406 receives a communication analogous to the communication 411 and transmits an acknowledgment communication analogous to the communication 413.

In the illustrated implementation, the synchronizer 454 transmits in communications 415 and 417 an indication of a state data execution transition instructing the first processor 406 and the second processor 408 to transition execution to the next state data that is communicated in communications 407 and/or 413 from the initial state data, essentially turning the next state data of the first update cycle 490 into initial state data for the second update cycle 494.

The communications 415 and 417 may be made based at least in part on the synchronizer 454 incrementing a state data counter with a value that represents a version of state data on which the processors 406 and 408 are actively executing to reflect that the state data counter value indicates the next state data should be executed as the initial state data in the second update cycle 494. The synchronizer 454 may increment this counter or otherwise generate a state data execution transition in response to receiving acknowledgments of receipt of the modified state data by the processors 406 and/or 408 in communication 413. In this implementation, the counter value may be transmitted in communications 415 and 417.

In an alternative implementation, the state data counter is transmitted with the communications 407 and/or 411 (and/or a communication analogous to the communication 411 for the first processor 406), and the first processor 406 and the second processor 408 execute from the transitioned-to next state data (that becomes the initial state data in the second update cycle 494) upon the termination of the first update cycle 490 without waiting for an acknowledgment. In these alternative implementations, one or more of communications 413-417 may be omitted. The state data manager 452 may unlock writing modified state data to the state data buffer of the first processor 406 at the beginning of the second update cycle 494 in communication 419.

Figure 5:
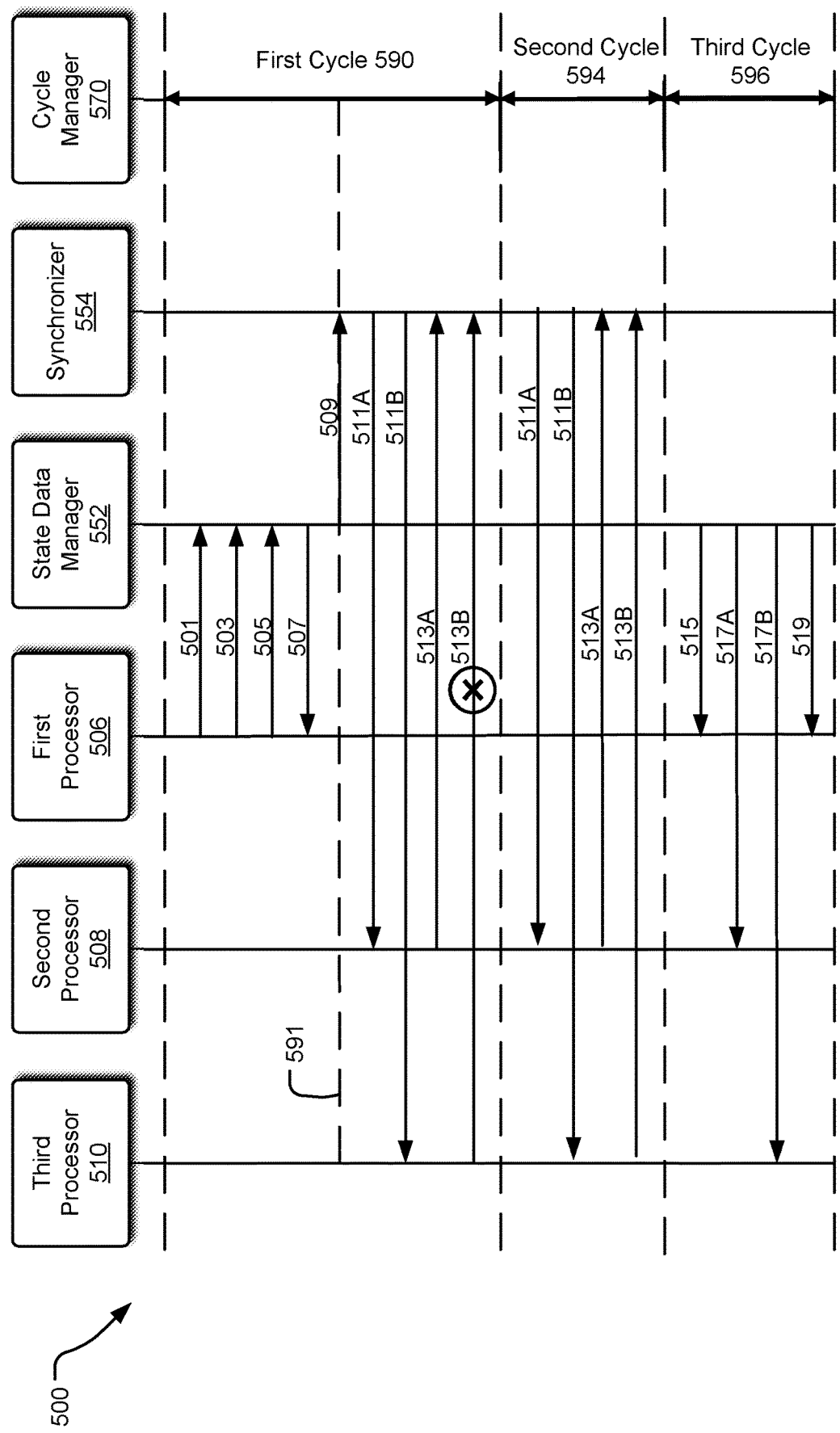
FIG. 5 illustrates another example data flow within an example system with multi-processor state synchronization.

FIG. 5 illustrates another example data flow 500 within an example system with multi-processor state synchronization. When a first update cycle 590 is initiated, the processors 506 and 508 execute on initial state data representing a state of the system from a previous update cycle. State data updates representing changes in the state of the system are transmitted by a first processor 506 to a state data manager 552 in communications 501-503. In the illustrated implementation, the first processor 506 is a synchronization master processor. A modified state data update based at least in part on the state data updates transmitted in communications 501-503 is transmitted and/or written from the state data manager 552 to a portion of the state data buffer of the first processor 506 (e.g., in a portion of the master state buffer operable to store modified state data) in communication 507. Although the modified state data update communicated in communication 507 is illustrated as including all of the state data updates from communications 501-503, implementations are contemplated in which separate modified state data updates are made based at least in part on each of the state data updates in communications 501-503 in separate communications 507.

When a predefined progress position 591 of a first update cycle 590 is reached, it may signal the completion of the write portion of the first update cycle and the beginning of a transmission and acknowledgment portion of the first update cycle. The update cycles may be managed by an update cycle manager 570 that is in communication with one or more of the first processor 506, the second processor 508, the state data manager 552, and the synchronizer 554. Upon reaching the predefined progress position 591 of the first update cycle 590, the state data manager 512 may lock edits to the modified state data in the state data buffer of the first processor 506. The state data manager 512 may then designate the modified state data stored in the buffer as next state data and communicate the new next state data to the synchronizer 554 in a communication 409. Further, although not illustrated, the first processor 506 may transfer or copy the designated next state data to a different data portion of a first state data buffer associated with the first processor 506.

Upon reaching the predefined progress position 591, the state data manager 552 designates the modified state data as next state data. Then, the synchronizer 554 communicates next state data to the second processor 508 and the third processor 510 in communications 511A and 511B, respectively. The second processor 508, based at least in part on communication 511A being received, transmits an acknowledgment of receipt of the modified state data from the communication 511A to the synchronizer 554 in a communication 513A. However, the communication 513B with an analogous acknowledgment from the third processor 510 is not received by the state data manager 512. This may be due to a connection error or due to the third processor 510 not receiving a processable instance of the communication 511B). In this implementation, the synchronizer 554 is operable to recognize that the system is not prepared to execute a state data execution transition because it is unclear whether the third processor 510 received the modified state data transmitted in communication 511B.

Implementations (like the illustrated implementation) are contemplated in which the state data manager 552 continues to lock updates to the modified state data in the master state data buffer of a first processor 506 into the second update cycle 594. In these implementations, the communications 511A and 511B transmitted in the second update cycle 594 are repeats of the communications transmitted during the first update cycle. The communications 513A and 513B represent acknowledgments transmitted by the second processor 508 and the third processor 510 to the synchronizer 554, acknowledging receipt of the next state data in the repeated communications 511A and 511B in the second update cycle 594. If sufficient time exists in the transmission and acknowledgment portion of the first update cycle 590, the repeated instances of the communications 511A and 511B and the communications 513A and 513B may be transmitted to the synchronizer 554 within the transmission and acknowledgment portion of the first update cycle 590 (not illustrated).

In an alternative implementation (not illustrated), the state data manager 552 may unlock editing the modified data portion of the state data buffer of the first processor 506 at the completion of the first update cycle 590 regardless of whether acknowledgments are received. In this implementation, updates similar to those of communications 501-505 may be used to further update the modified state data comprising the next state data designated in the prior update cycle (e.g., treating the next state data as modified state data to be designated again as next state data). In this implementation, the second instances of communications 511A and 511B may include different next state data with the further updates made in the second update cycle 594. This further modified state data may be written to the same portion of one or more of the state data buffers in which the previous modified state data was written (e.g., exclusively in a master state buffer associated with the first processor 506) based at least in part on receiving the first instance of communications 511A and 511B to make new next state data (e.g., replacing or updating the next state data established in the first update cycle 590 without having transitioned execution to the next state data established in the first update cycle 590).

In the illustrated implementation, the synchronizer 554 transmits in communications 515, 517A, and 517B an indication of a state data execution transition instructing the first processor 506, the second processor 508, and the third processor 510 to transition execution to the next state data that is based at least in part on the modified data transmitted in communications 507 and/or 513A and/or 513B from the initial state data, essentially utilizing the next state data as initial state data for the third update cycle 596 (or second update cycle 596 if the repeated communications 511A and 511B can be retransmitted within the first update cycle 590). The communications 515, 517A, and/or 517B may be based at least in part on completion of the second update cycle 594 (or second update cycle 596 if the repeated communications 511A and 511B can be retransmitted within the first update cycle 590). The communications 515, 517A, and 517B may additionally or alternatively be made based at least in part on the synchronizer 554 incrementing a state data counter to reflect that the state data counter value indicates the next state data should be executed as the initial state data in the third update cycle 596 (or second update cycle 596 if the repeated communications 511A and 511B can be retransmitted within the first update cycle 590). The synchronizer 554 may increment this counter or otherwise generate a state data execution transition in response to receiving acknowledgments of receipt of the next state data by the processors 506, 508, and/or 510 in communications 513A and 513B (and an analogous communication for processor 506 in relevant implementations). In this implementation, the state data counter value may be communicated in communications 515, 517A, and/or 517B.

In an alternative implementation, the state data counter value is communicated with the communications 507, 511A, and/or 511B (and/or a communication analogous to the communications 511A and 511B for the first processor 506), and the first processor 506, the second processor 508, and the third processor 510 execute from the transitioned-to next state data (that becomes the initial state data in the third update cycle 594) upon the termination of the first update cycle 590 without waiting for an acknowledgment. In these alternative implementations, one or more of communications 513A-517 may be omitted. The state data manager 552 may unlock writing state data updates to the modified state data in the state data buffer of the first processor 506 at the beginning of the third update cycle 596 in communication 519.

Figure 6:
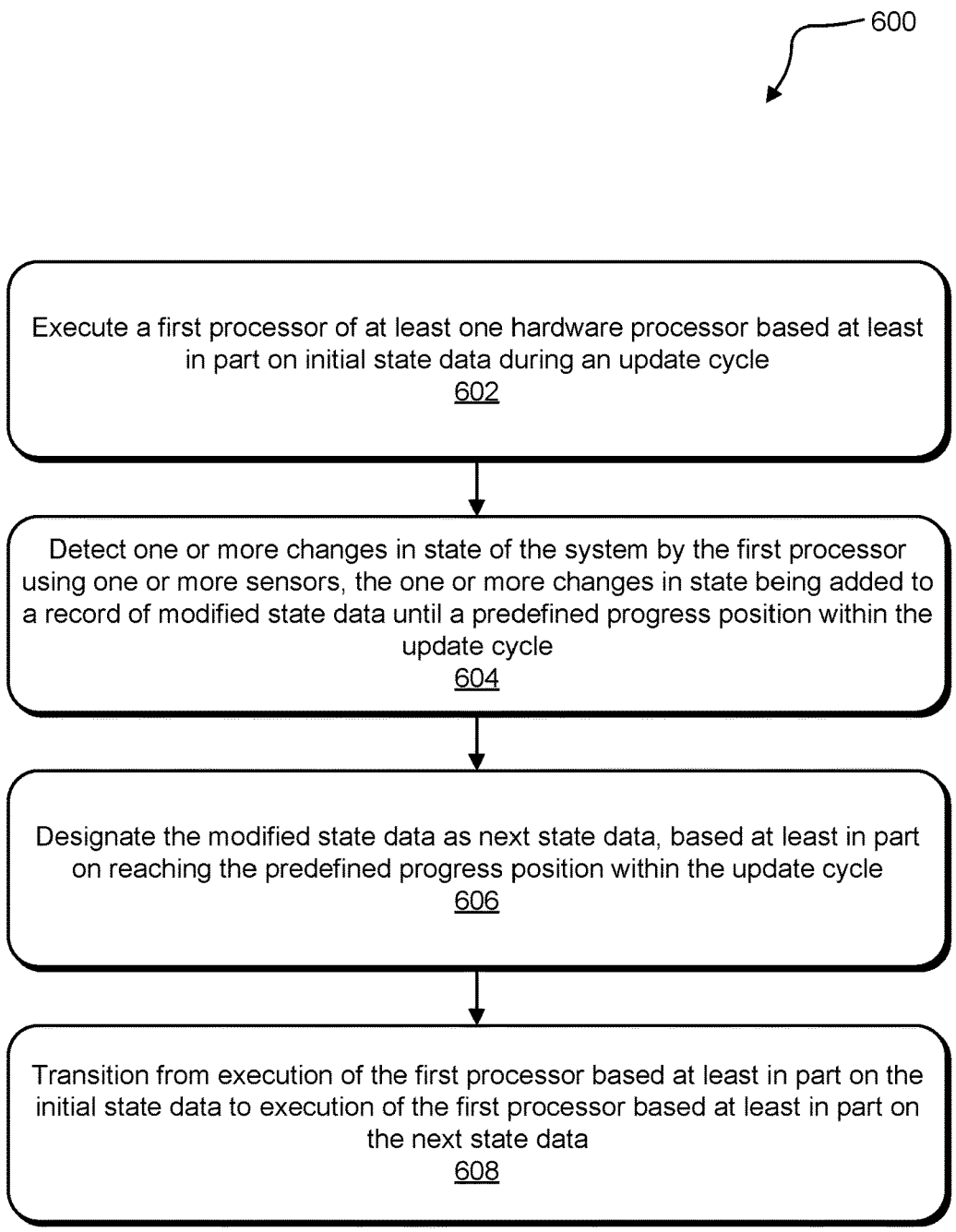
FIG. 6 illustrates example operations for synchronizing system state data executable by at least one hardware processor of a system.

FIG. 6 illustrates example operations 600 for synchronizing system state data executable by at least one hardware processor of a system. An executing operation 602 executes a first processor of the at least one hardware processor based at least in part on initial state data during an update cycle. The initial state data represents a state of the system prior to initiating the update cycle. When a first update cycle is initiated, processors execute on the initial state data representing a state of the system from a previous update cycle.

A detecting operation 604 detects one or more changes in state of the system by the first processor using one or more sensors, the one or more changes in state being added to a record of modified state data until a predefined progress position within the update cycle. State data updates representing changes in the state of the system are transmitted by a first processor to a state data manager. In implementations, a first processor is a synchronization master processor. A modified state data update based at least in part on the state data updates is communicated and/or written from a state data manager to a portion of a state data buffer of the first processor (e.g., in a portion of the master state buffer operable to store modified state data).

A designating operation 606 designates the modified state data as next state data, based at least in part on reaching the predefined progress position within the update cycle. When a predefined progress position of the first update cycle is reached, it may signal the completion of the write portion of the first update cycle and the beginning of a transmission and acknowledgment portion of the first update cycle. The update cycles may be managed by an update cycle manager that is in communication with one or more of the first processor, a second processor, a third processor, the state data manager, and a synchronizer. Upon reaching the predefined progress position of the first update cycle, the state data manager may lock edits to the modified state data in the state data buffer of the first processor. The state data manager may then designate the modified state data stored in the buffer as next state data and communicate the new next state data to the synchronizer.

The synchronizer then communicates next state data to other processors (e.g., synchronization slave processors). Each of the other processors transmits, based at least in part on the communicated next state data, an acknowledgment of receipt of the modified state data to the synchronizer. In an implementation, if one of the processors fails to acknowledge, the synchronizer is operable to recognize that the system is not prepared to execute a state data execution transition because it is unclear whether the processor that failed to acknowledge receipt of the next state data received the next state data transmitted in communication.

Implementations are contemplated in which the state data manager continues to lock updates to the modified state data in the first processor's master state data buffer into the second update cycle. In these implementations, the communications in the second update cycle are repeats of the communications transmitted during the first update cycle. The processors may, based at least in part on the communications in the second update cycle, communicate acknowledgments transmitted to the synchronizer acknowledging receipt of the next state data in the repeated communications in the second update cycle. Alternatively, if sufficient time remains in the transmission and acknowledgment portion of the first update cycle, the repeated instances of the communications of the next state data and acknowledgments may be communicated to the synchronizer within the transmission and acknowledgment portion of the first update cycle.

In an alternative implementation, the state data manager may unlock editing the modified data portion of the state data buffer of the first processor at the completion of the first update cycle regardless of whether acknowledgments are received. In this implementation, updates similar be accepted during the second update cycle to further update the modified state data comprising the next state data designated in the prior update cycle (e.g., treating the next state data as modified state data to be designated again as next state data at the completion of the second update cycle). In this implementation, the second instances of communications for communicating next state data include different next state data with the further updates made in the second update cycle. This further modified state data may be written to the same portion of one or more of the state data buffers in which the previous modified state data was written (e.g., exclusively in a master state buffer associated with the first processor) to generate new next state data (e.g., replacing or updating the next state data established in the first update cycle without having transitioned execution to the next state data established in the first update cycle.

A transitioning operation 608 transitions from execution of the first processor based at least in part on the initial state data to execution of the first processor based at least in part on the next state data, based at least in part on completion of the update cycle. In an implementation, the synchronizer communicates an indication of a state data execution transition instructing the processors to transition execution to the next state data from the initial state data, essentially utilizing the next state data as initial state data for a third update cycle (or a second update cycle if the repeated communications including the next state data can be retransmitted within the first update cycle). The transitioning operation may be a response to the synchronizer incrementing a state data counter to reflect that the state data counter value indicates the next state data should be executed as the initial state data in the third update cycle (or second update cycle if the repeated communications can be retransmitted within the first update cycle). The synchronizer may increment this counter or otherwise generate a state data execution transition in response to receiving acknowledgments of receipt of the next state data by the processors.

In implementations, the state data counter value may be communicated in a same or different communication as the next state data. Implementations are contemplated in which the transitioning operation 608 transitions processor execution to processing from the next state data without waiting for an acknowledgment. Upon the conclusion of the update cycle in which the next data is communicated, the state data manager may unlock writing state data updates to the modified state data in the state data buffer of one or more of the processors (e.g., of a synchronization master processor).

Figure 7:
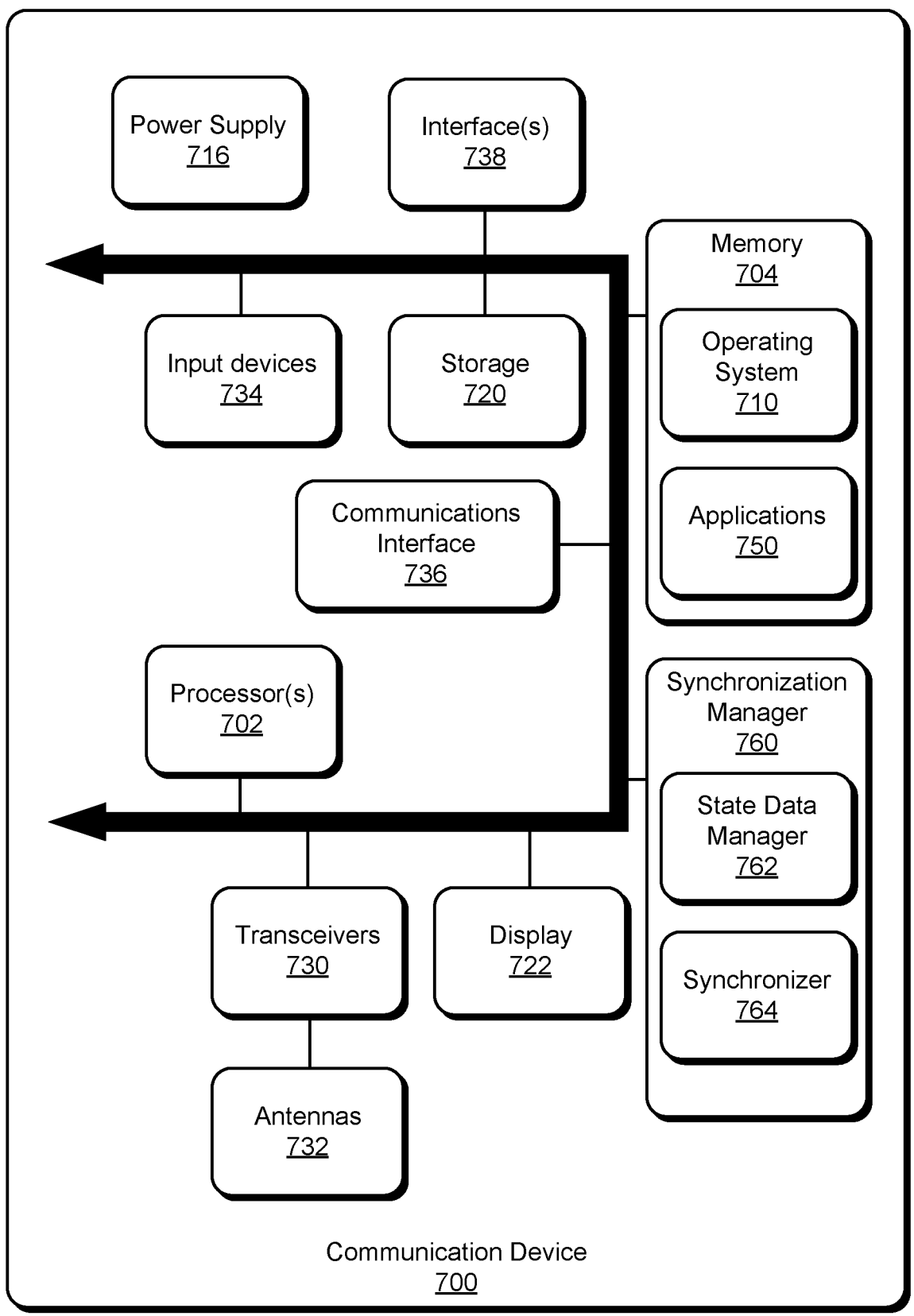
FIG. 7 illustrates an example computing device 700 for implementing the features and operations of the described technology.

FIG. 7 illustrates an example computing device 700 for implementing the features and operations of the described technology. The computing device 700 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. In implementations, the elements of systems 100, 200, and 300 may be implementations of or may be elements of implementations of the computing device 700.

The computing device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702. In implementations, the processor(s) 702 and/or the memory 704 may include a state data buffer. In implementations, the state data buffer may include first and second data portions configured to store (e.g., alternatively) initial state data and next state data. In implementations, the state data buffer may further include a portion configured to store modified state data modified based at least in part on state data updates. Implementations are also contemplated in which the state data, including the state data buffers disclosed herein, are elements of the firmware of the processor(s) 702 (or the hardware used to couple the processors) or stored in the cache of the processor(s) 702.

In an example computing device 700, as shown in FIG. 7, one or more modules or segments, such as applications 750, a synchronization manager, a state data manager, a synchronizer, and an update cycle manager, are loaded into the operating system 710 on the memory 704 and/or storage 720 and executed by processor(s) 702. The storage 720 may include one or more tangible storage media devices and may store state data updates, modified state data, initial state data, next state data, cycles, predefined progress positions of a cycle, a writing portion of the cycle, a transmission and acknowledgment portion of a cycle, a state data counter, an iteration of a state data counter, a communication, an acknowledgment, a data lock, a state data buffer, a slave state buffer, a master state buffer, locally and globally unique identifiers, requests, responses, and other data and be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a communications interface 736 (e.g., a network adapter), which is a type of computing device. The computing device 700 may use the communications interface 736 and any other types of computing devices for establishing connections over a wide-area network (WAN) or local-area network (LAN). It should be appreciated that the network connections shown are examples and that other computing devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722 (e.g., an implementation of one or more of displays 104a and 104b), such as a touch screen display.

The computing device 700 may include a synchronization manager 760 operable to synchronize state data between processors of the computing device 700. Implementations are contemplated in which the synchronization manager 760 is a dedicated hardware element, is a hybrid of software and dedicated hardware, or is purely software. Alternatively, the synchronization manager 760 may be integral to one or more of the processor(s) 702 (e.g., a synchronization master processor or any other of processor(s) 702) and/or the memory 704. In implementations, the synchronization manager 760 includes one or more of a state data manager 762 operable to manage modifications to state data and a synchronizer 764 operable to coordinate the state date between different processors.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Examples of tangible processor-readable storage media include, but are not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method of synchronizing system state data executable by at least one hardware processor of a system is provided. The method includes executing a first processor of the at least one hardware processor based at least in part on initial state data during an update cycle, wherein the initial state data represents a state of the system prior to initiation of the update cycle, detecting one or more changes in state of the system by the first processor using one or more sensors, the one or more changes in state being added to a record of modified state data until a predefined progress position within the update cycle, designating the modified state data as next state data, based at least in part on reaching the predefined progress position within the update cycle, and transitioning from execution of the first processor based at least in part on the initial state data to execution of the first processor based at least in part on the next state data, based at least in part on completion of the update cycle. One or more technical benefits provided by the features of this example method include the synchronization of executed state data between multiple processors to ensure all of the processors for which the state data is relevant execute based at least in part on current state data at the same time.

Another example method of any preceding method is provided, wherein the operation of designating comprises communicating the next state data to a second processor of the at least one hardware processor and wherein the method further includes transitioning from execution of the second processor based at least in part on the initial state data to execution of the second processor based at least in part on the next state data, based at least in part on completion of the update cycle. One or more technical benefits provided by the features of this example method include that both the first and second processors may execute based at least in part on the same, current state data.

Another example method of any preceding method is provided, wherein the method further includes receiving an acknowledgment that the second processor received the next state data, wherein the operations of transitioning are further based at least in part on the received acknowledgment. One or more technical benefits provided by the features of this example method include that the state data based at least in part upon which the processors execute is acknowledged to be received and utilizable by the multiple processors.

Another example method of any preceding method is provided, wherein the initial state data is stored in a first state data portion of a first state data buffer associated with the first processor, the next state data is stored in a second portion of the first state data buffer, and the modified state data is stored in a modified state data portion of the first state data buffer and wherein the operation of transitioning includes transitioning from execution of the first processor on the first state data portion of the first state data buffer to execution of the first processor on the second portion of the first state data buffer. One or more technical benefits provided by the features of this example method include that a uniform structure for storing state data between processors allows for standardization and uniformity between different models and vendors and allows the state data structure to be used for both single-processor systems and multiprocessor systems.

Another example method of any preceding method is provided, wherein the initial state data is stored in a first state data portion of a second state data buffer associated with a second processor of the at least one hardware processor, and the next state data is stored in a second state data portion of the second state data buffer and wherein the operation of transitioning includes transitioning from execution of the second processor on the first state data portion of the second state data buffer to execution of the second processor on the second portion of the second state data buffer. One or more technical benefits provided by the features of this example method include that a uniform structure for storing state data between processors allows for standardization and uniformity between different models and vendors and allows the state data structure to be used for both single-processor systems and multiprocessor systems.

Another example method of any preceding method is provided, wherein the method further includes locking modification of the modified state data based at least in part on reaching the predefined progress position in the update cycle. One or more technical benefits provided by the features of this example method include ensuring that the modified state data to be designated next state data is not further modified after the designation to maintain consistency in the next state data transmitted.

Another example method of any preceding method is provided, wherein the detected one or more changes in state include a physical engagement with a device including the at least one hardware processor. One or more technical benefits provided by the features of this example method include ensuring synchronization of state data based upon which processors of a device execute such that the device responds in a predetermined fashion in response to a physical engagement with the device.

An example system including at least one hardware processor operable to synchronize state data of the system executable by the at least one hardware processor, the system including a first processor of the at least one hardware processor and a synchronization manager. The synchronization manager is operable to execute the first processor based at least in part on initial state data during an update cycle, wherein the initial state data represents a state of the system prior to initiation of the update cycle, detect one or more changes in state of the system by the first processor using one or more sensors, the one or more changes in state being added to a record of modified state data until a predefined progress position within the update cycle, designate the modified state data as next state data, based at least in part on reaching the predefined progress position within the update cycle, and transition from execution of the first processor based at least in part on the initial state data to execution of the first processor based at least in part on the next state data, the transition based at least in part on completion of the update cycle.

Another example system of any preceding system is provided, wherein the synchronization manager is further operable to communicate the next state data to a second processor of the at least one hardware processor and transition from execution of the second processor based at least in part on the initial state data to execution of the second processor based at least in part on the next state data, the transition based at least in part on completion of the update cycle.

Another example system of any preceding system is provided, wherein the synchronization manager is further operable to receive an acknowledgment that the second processor of the at least one hardware processor received the next state data, wherein the transitions are further based at least in part on the received acknowledgment.

Another example system of any preceding system is provided further including a first state data buffer including a first state data portion, a second state data portion, and a modified state data portion, wherein the initial state data is stored in the first state data portion of the first state data buffer associated with the first processor, the next state data is stored in the second state data portion of the first state data buffer, and the modified state data is stored in the modified state data portion of the first state data buffer, and wherein the transition further includes a transition from execution of the first processor on the first state data portion of the first state data buffer to execution of the first processor on the second state data portion of the first state data buffer.

Another example system of any preceding system is provided further including a second state data buffer associated with a second processor of the at least one hardware processor including a first state data portion of the second state data buffer and a second state data portion of the second state data buffer, wherein the initial state data is stored in the first state data portion of the second state data buffer, and the next state data is stored in the second state data portion of the second state data buffer, and wherein the transition further includes a transition from execution of the second processor on the first state data portion of the second state data buffer to execution of the second processor on the second state data portion of the second state data buffer.

Another example system of any preceding system is provided, wherein the detected one or more changes in state include a physical engagement with a device including the at least one hardware processor.

Another example system of any preceding system is provided, wherein the system is operable to activate a synchronization manager, based at least in part on the detected one or more changes in state, the activated synchronization manager operable to conduct one or more of the designation and transition.

One or more example processor-readable storage media devices embodied with instructions executable on a system including at least one hardware processor a process of synchronizing state data on the at least one hardware processor is provided. The process includes executing a first processor of the at least one hardware processor based at least in part on initial state data during an update cycle, wherein the initial state data represents a state of the system prior to initiation of the update cycle, detecting one or more changes in state of the system by the first processor using one or more sensors, the one or more changes in state being added to a record of modified state data until a predefined progress position within the update cycle, designating the modified state data as next state data, based at least in part on reaching the predefined progress position within the update cycle, and transitioning from execution of the first processor based at least in part on the initial state data to execution of the first processor based at least in part on the next state data, based at least in part on completion of the update cycle.

One or more other example processor-readable storage media devices of any preceding media devices is provided, wherein the operation of designating includes communicating the next state data to a second processor of the at least one hardware processor and wherein the process further includes transitioning from execution of the second processor based at least in part on the initial state data to execution of the second processor based at least in part on the next state data, based at least in part on completion of the update cycle.

One or more other example processor-readable storage media devices of any preceding media devices is provided, wherein the process further includes receiving an acknowledgment that the second processor of the at least one hardware processor received the next state data, wherein the operation of transitioning is further based at least in part on the received acknowledgment and the acknowledgment includes data representing a version of one or more of the initial state data and the next state data.

One or more other example processor-readable storage media devices of any preceding media devices is provided, wherein the initial state data is stored in a first state data portion of a first state data buffer associated with the first processor, the next state data is stored in a second portion of the first state data buffer, and the modified state data is stored in a modified state data portion of the first state data buffer, and wherein the operation of transitioning further includes transitioning from execution of the first processor on the first state data portion of the first state data buffer to execution of the first processor on the second portion of the first state data buffer.

One or more other example processor-readable storage media devices of any preceding media devices is provided, wherein the initial state data is stored in a first state data portion of a second state data buffer associated with a second processor of the at least one hardware processor, and the next state data is stored in a second state data portion of the second state data buffer, and wherein the operation of transitioning further includes transitioning from execution of the second processor on the first state data portion of the second state data buffer to execution of the second processor on the second portion of the second state data buffer.

One or more other example processor-readable storage media devices of any preceding media devices is provided, wherein the detected one or more changes in state include a physical engagement with a device including the at least one hardware processor.

An example system for synchronizing system state data executable by at least one hardware processor of a system is provided. The system includes means for executing a first processor of the at least one hardware processor based at least in part on initial state data during an update cycle, wherein the initial state data represents a state of the system prior to initiation of the update cycle, means for detecting one or more changes in state of the system by the first processor using one or more sensors, the one or more changes in state being added to a record of modified state data until a predefined progress position within the update cycle, means for designating the modified state data as next state data, based at least in part on reaching the predefined progress position within the update cycle, and means for transitioning from execution of the first processor based at least in part on the initial state data to execution of the first processor based at least in part on the next state data, based at least in part on completion of the update cycle.

Another example system of any preceding system is provided, wherein the means for designating includes means for communicating the next state data to a second processor of the at least one hardware processor and wherein the system further includes means for transitioning from execution of the second processor based at least in part on the initial state data to execution of the second processor based at least in part on the next state data, based at least in part on completion of the update cycle.

Another example system of any preceding system is provided, wherein the system further includes means for receiving an acknowledgment that the second processor received the next state data, wherein the means for transitioning transition further based at least in part on the received acknowledgment.

Another example system of any preceding system is provided, wherein the initial state data is stored in a first state data portion of a first state data buffer associated with the first processor, the next state data is stored in a second portion of the first state data buffer, and the modified state data is stored in a modified state data portion of the first state data buffer and wherein the means for transitioning includes means for transitioning from execution of the first processor on the first state data portion of the first state data buffer to execution of the first processor on the second portion of the first state data buffer.

Another example system of any preceding system is provided, wherein the initial state data is stored in a first state data portion of a second state data buffer associated with a second processor of the at least one hardware processor, and the next state data is stored in a second state data portion of the second state data buffer and wherein the means for transitioning includes means for transitioning from execution of the second processor on the first state data portion of the second state data buffer to execution of the second processor on the second portion of the second state data buffer.

Another example system of any preceding system is provided, wherein the system further includes means for locking modification of the modified state data based at least in part on reaching the predefined progress position in the update cycle.

Another example system of any preceding system is provided, wherein the detected one or more changes in state include a physical engagement with a device including the at least one hardware processor.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric relative to the quantitative or qualitative feature described. For example, a term of relative degree applied to orthogonality suggests an angle may have a magnitude of variability relative to a right angle. When values are presented herein for particular features and/or a magnitude of variability, ranges above, ranges below, and ranges between the values are contemplated.

What is claimed is:

1. A method of synchronizing system state data executable by at least one hardware processor of a system, the method comprising:

executing a first processor of the at least one hardware processor based at least in part on initial state data during a first update cycle, wherein the initial state data represents an initial system state of the system prior to initiation of the first update cycle;

detecting, prior to a predefined progress position within the first update cycle, one or more first changes in state of the system by the first processor using one or more sensors, the one or more first changes in state being added to a first record of modified state data until the predefined progress position within the first update cycle;

designating the first record of modified state data as second cycle state data, based at least in part on reaching the predefined progress position within the first update cycle;

detecting, after the predefined progress position within the first update cycle, one or more second changes in state of the system by the first processor using one or more sensors, the one or more second changes in state being added to a second record of modified state data; and transitioning, upon completion of the first update cycle, from execution of the first processor based on the initial state data in the first update cycle, to execution of the first processor based on the second cycle state data in a second update cycle after the completion of the first update cycle.

2. The method of claim 1, wherein the operation of designating comprises:

communicating the second cycle state data to a second processor of the at least one hardware processor, and wherein the method further comprises:

transitioning, upon completion of the first update cycle, from execution of the second processor based at least in part on the initial state data to execution of the second processor based at least in part on the second cycle state data.

3. The method of claim 2, wherein the method further comprises:

receiving an acknowledgment that the second processor received the second cycle state data, wherein the operations of transitioning are further based at least in part on the received acknowledgment.

4. The method of claim 1, wherein, between the predefined progress position and the completion of the first update cycle, the initial state data is stored in a first state data portion of a first state data buffer associated with the first processor, the second cycle state data is stored in a second portion of the first state data buffer, and the second record of modified state data is stored in a modified state data portion of the first state data buffer, and wherein the operation of transitioning includes transitioning from execution of the first processor on the first state data portion of the first state data buffer to execution of the first processor on the second portion of the first state data buffer.

5. The method of claim 4, wherein the initial state data is stored in a first state data portion of a second state data buffer associated with a second processor of the at least one hardware processor, and the second cycle state data is stored, responsive to reaching the predefined progress position, in a second state data portion of the second state data buffer, and wherein the operation of transitioning includes transitioning from execution of the second processor on the first state data portion of the second state data buffer to execution of the second processor on the second portion of the second state data buffer.

6. The method of claim 1, wherein the method further comprises:

locking modification of the first record of the modified state data based at least in part on reaching the predefined progress position in the first update cycle.

7. The method of claim 1, wherein the detected one or more first changes in state include a physical engagement with a device including the at least one hardware processor.

8. A system including at least one hardware processor operable to synchronize state data of the system executable by the at least one hardware processor, the system comprising:

a first processor of the at least one hardware processor, wherein the first processor is configured to execute based at least in part on initial state data during a first update cycle, wherein the initial state data represents an initial system state of the system prior to initiation of the first update cycle; and a synchronization manager operable to:

detect, prior to a predefined progress position within the first update cycle, one or more first changes in state of the system by the first processor using one or more sensors, the one or more first changes in state being added to a first record of modified state data until the predefined progress position within the first update cycle;

designate the first record of modified state data as second cycle state data, based at least in part on reaching the predefined progress position within the first update cycle; and transition, responsive to completion of the first update cycle, from execution of the first processor based on the initial state data in the first update cycle, to execution of the first processor based on the second cycle state data in a second update cycle after the completion of the first update cycle.

9. The system of claim 8, wherein the synchronization manager is further operable to:

communicate the second cycle state data to a second processor of the at least one hardware processor; and transition, responsive to completion of the first update cycle, from execution of the second processor based at least in part on the initial state data in the first update cycle, to execution of the second processor based at least in part on the second cycle state data in the second update cycle.

10. The system of claim 9, wherein the synchronization manager is further operable to:

receive an acknowledgment that the second processor of the at least one hardware processor received the second cycle state data, wherein the transitions are further based at least in part on the received acknowledgment.

11. The system of claim 8, further comprising:

a first state data buffer including a first state data portion, a second state data portion, and a modified state data portion, wherein, between the predefined progress position and the completion of the first update cycle, the initial state data is stored in the first state data portion of the first state data buffer associated with the first processor, the second cycle state data is stored in the second state data portion of the first state data buffer, and the first record of modified state data is stored in the modified state data portion of the first state data buffer, and wherein the transition further includes a transition from execution of the first processor on the first state data portion of the first state data buffer to execution of the first processor on the second state data portion of the first state data buffer.

12. The system of claim 11, further comprising:
a second state data buffer associated with a second processor of the at least one hardware processor including a first state data portion of the second state data buffer and a second state data portion of the second state data buffer,
wherein the initial state data is stored in the first state data portion of the second state data buffer, and the second cycle state data is stored, responsive to reaching the predefined progress position, in the second state data portion of the second state data buffer, and
wherein the transition further includes a transition from execution of the second processor on the first state data portion of the second state data buffer to execution of the second processor on the second state data portion of the second state data buffer.

13. The system of claim 8, wherein the detected one or more first changes in state include a physical engagement with a device including the at least one hardware processor.

14. The system of claim 8, wherein the system is operable to activate the synchronization manager, based at least in part on the one or more sensors detecting the one or more first changes in state, the activated synchronization manager being operable to conduct one or more of the designation and the transition.

15. One or more tangible processor-readable storage media devices embodied with instructions executable on a system including at least one hardware processor a process of synchronizing state data on the at least one hardware processor, the process comprising:
executing a first processor of the at least one hardware processor based at least in part on initial state data during a first update cycle, wherein the initial state data represents an initial system state of the system prior to initiation of the first update cycle;
detecting, prior to a predefined progress position within the first update cycle, one or more first changes in state of the system using one or more sensors, the one or more first changes in state being added to a first record of modified state data until the predefined progress position within the first update cycle;
designating the first record of modified state data as second cycle state data, based at least in part on reaching the predefined progress position within the first update cycle;
detecting, after the predefined progress position within the first update cycle, one or more second changes in state of the system by the first processor using one or more sensors, the one or more second changes in state being added to a second record of modified state data; and
transitioning, upon completion of the first update cycle, from execution of the first processor based on the initial state data in the first update cycle, to execution of the first processor based on the second cycle state data in a second update cycle after the completion of the first update cycle.

16. The one or more tangible processor-readable storage media devices of claim 15, wherein the operation of designating comprises:
communicating the second cycle state data to a second processor of the at least one hardware processor, and
wherein the process further comprises transitioning, responsive to completion of the first update cycle, from execution of the second processor based at least in part on the initial state data to execution of the second processor based at least in part on the second cycle state data.

17. The one or more tangible processor-readable storage media devices of claim 16, wherein the process further comprises:
receiving an acknowledgment that the second processor of the at least one hardware processor received the second cycle state data, wherein the operations of transitioning are further based at least in part on the received acknowledgment and the acknowledgment includes data representing a version of the initial state data or the second cycle state data.

18. The one or more tangible processor-readable storage media devices of claim 15, wherein, between the predefined progress position and the completion of the first update cycle, the initial state data is stored in a first state data portion of a first state data buffer associated with the first processor, the second cycle state data is stored in a second portion of the first state data buffer, and the second record of modified state data is stored in a modified state data portion of the first state data buffer, and
wherein the operation of transitioning includes transitioning from execution of the first processor on the first state data portion of the first state data buffer to execution of the first processor on the second portion of the first state data buffer.

19. The one or more tangible processor-readable storage media devices of claim 18, wherein the initial state data is stored in a first state data portion of a second state data buffer associated with a second processor of the at least one hardware processor, and the second cycle state data is stored, responsive to reaching the predefined progress position, in a second state data portion of the second state data buffer, and
wherein the operation of transitioning includes transitioning from execution of the second processor on the first state data portion of the second state data buffer to execution of the second processor on the second portion of the second state data buffer.

20. The one or more tangible processor-readable storage media devices of claim 15, wherein the detected one or more first changes in state include a physical engagement with a device including the at least one hardware processor.

21. The method of claim 1, further comprising:
detecting, upon an initiation of the second update cycle, one or more further second changes in state of the system by the first processor using one or more sensors, the one or more further second changes in state being added to the second record of modified state data;
designating the second record of modified state data as third cycle state data, based at least in part on reaching the predefined progress position within the second update cycle; and
transitioning, upon completion of the second update cycle, from execution of the first processor based on the second cycle state data in the second update cycle, to execution of the first processor based on the third cycle state data in a third update cycle after the completion of the second update cycle.

* * * * *